(12) United States Patent
Fleck et al.

(10) Patent No.: US 11,769,895 B2
(45) Date of Patent: Sep. 26, 2023

(54) REDOX FLOW BATTERY AND METHOD FOR OPERATING A REDOX FLOW BATTERY

(71) Applicant: Siemens Aktiengesellschaft, Munich (DE)

(72) Inventors: Robert Fleck, Adelsdorf (DE); Barbara Schricker, Erlangen (DE); Jochen Friedl, Newcastle Upon Tyne (GB); Holger Wolfschmidt, Erlangen (DE)

(73) Assignee: LITRICITY GMBH, Rosenheim (DE)

( * ) Notice: Subject to any disclaimer, the term of this patent is extended or adjusted under 35 U.S.C. 154(b) by 0 days.

(21) Appl. No.: 16/618,587

(22) PCT Filed: May 28, 2018

(86) PCT No.: PCT/EP2018/063891
§ 371 (c)(1),
(2) Date: Dec. 2, 2019

(87) PCT Pub. No.: WO2018/224346
PCT Pub. Date: Dec. 13, 2018

(65) Prior Publication Data
US 2020/0161689 A1 May 21, 2020

(30) Foreign Application Priority Data
Jun. 9, 2017 (EP) .................................... 17275084

(51) Int. Cl.
*H01M 8/18* (2006.01)
*H01M 8/04186* (2016.01)

(52) U.S. Cl.
CPC ....... *H01M 8/188* (2013.01); *H01M 8/04186* (2013.01); *H01M 8/18* (2013.01)

(58) Field of Classification Search
CPC .......................... H01M 8/188; H01M 8/04186
See application file for complete search history.

(56) References Cited

U.S. PATENT DOCUMENTS

| 4,270,984 A * | 6/1981 | Frosch | H01M 8/188 |
| | | | 205/63 |
| 2014/0050947 A1* | 2/2014 | Donnelly | H01M 8/20 |
| | | | 429/7 |

(Continued)

FOREIGN PATENT DOCUMENTS

| CN | 102468499 A | 5/2012 | |
| CN | 104282927 A | 1/2015 | .............. H01M 8/04 |

(Continued)

OTHER PUBLICATIONS

Japanese Office Action, Application No. 2019565301, 7 pages, dated Dec. 1, 2020.

(Continued)

*Primary Examiner* — Matthew J Merkling
(74) *Attorney, Agent, or Firm* — Slayden Grubert Beard PLLC

(57) ABSTRACT

Various embodiments include a method for operating an electrically rechargeable redox flow battery comprising a first chamber and a second chamber separated by a membrane, with the first chamber comprising a cathode and the second chamber comprising an anode. The method comprises: introducting a first electrolyte as catholyte into the first chamber; and introducing a second electrolyte as anolyte into the second chamber. At least one of the first electrolyte or the second electrolyte comprises a reduction-oxidation pair. The oxidation number of the reduction-oxidation pair is changed by addition of a first component.

6 Claims, 1 Drawing Sheet

(56) References Cited

U.S. PATENT DOCUMENTS

| | | | |
|---|---|---|---|
| 2015/0017556 A1* | 1/2015 | Kim | H01M 8/04694 |
| | | | 429/409 |
| 2015/0093606 A1 | 4/2015 | Chen et al. | 429/50 |
| 2015/0280259 A1* | 10/2015 | Anderson | H01M 8/188 |
| | | | 429/409 |
| 2015/0303504 A1* | 10/2015 | Li | H01M 8/04455 |
| | | | 429/409 |
| 2016/0111740 A1 | 4/2016 | Spaziante et al. | 205/789.5 |
| 2017/0179516 A1* | 6/2017 | Evans | H01M 8/04731 |

FOREIGN PATENT DOCUMENTS

| | | | | |
|---|---|---|---|---|
| CN | 105637375 A | 6/2016 | | G01R 31/36 |
| DE | 10 2007 011 311 A1 | 6/2008 | | H01M 8/18 |
| DE | 10 2014 223 143 A1 | 5/2016 | | H01M 8/18 |
| JP | 2017123225 A | 7/1917 | | |
| JP | 0227667 A | 1/1990 | | |
| JP | 2014135212 A | 7/2014 | | |
| JP | 2015049969 A | 3/2015 | | |
| WO | 2014/001787 A1 | 1/2014 | | C01G 41/02 |
| WO | 2015/100216 A1 | 7/2015 | | H01M 8/18 |
| WO | 2018/224346 A1 | 12/2018 | | H01M 8/18 |

OTHER PUBLICATIONS

International Search Report and Written Opinion, Application No. PCT/EP2018/063891, 20 pages, dated Jul. 27, 2018.
Chinese Office Action, Application No. 201880037768.2, 18 pages, dated Feb. 9, 2022.

* cited by examiner

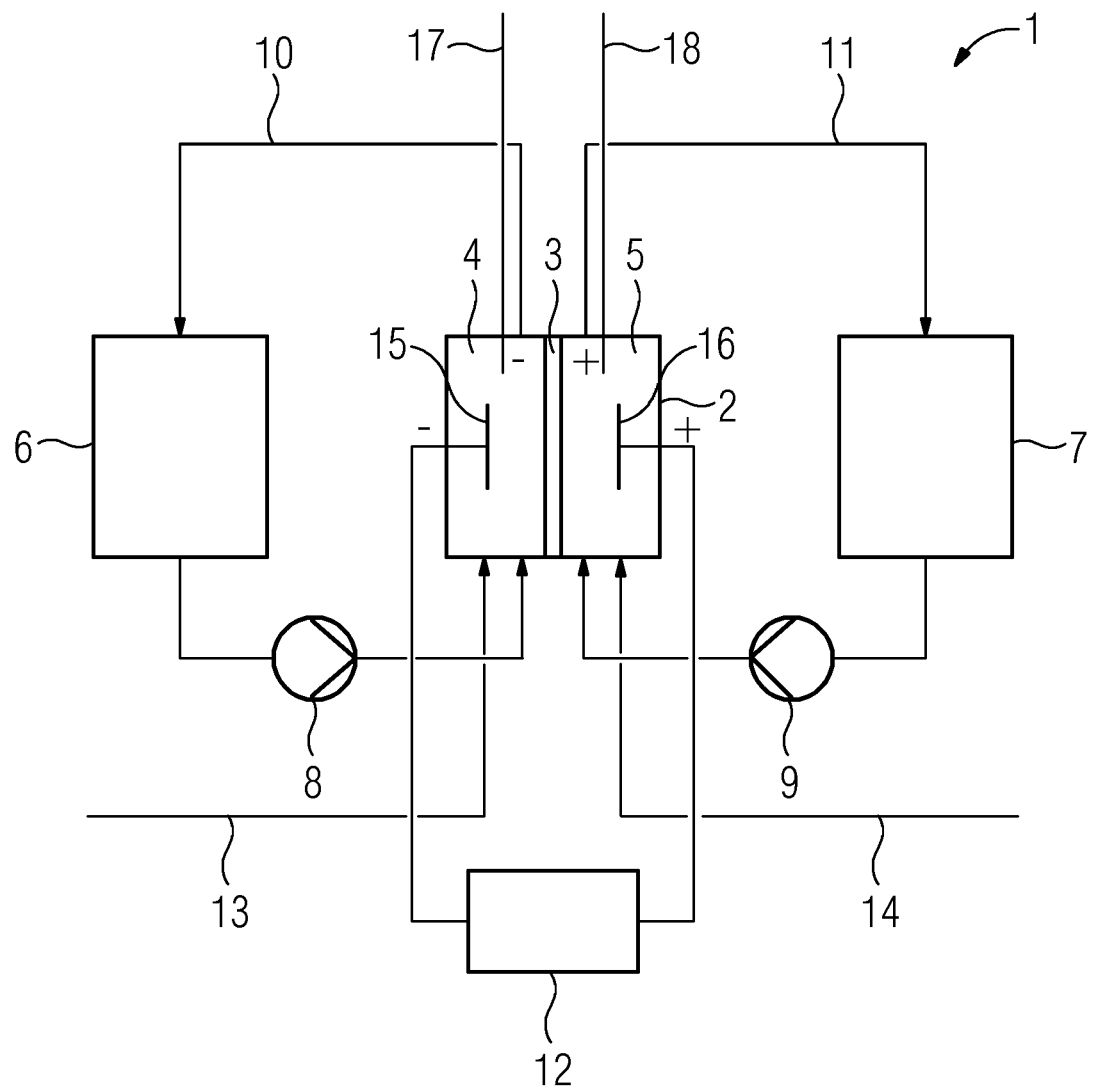

REDOX FLOW BATTERY AND METHOD FOR OPERATING A REDOX FLOW BATTERY

CROSS-REFERENCE TO RELATED APPLICATIONS

This application is a U.S. National Stage Application of International Application No. PCT/EP2018/063891 filed May 28, 2018, which designates the United States of America, and claims priority to EP Application No. 17275084.6 filed Jun. 9, 2017, the contents of which are hereby incorporated by reference in their entirety.

TECHNICAL FIELD

The present disclosure relates to batteries. Various embodiments may include redox flow batteries and/or methods for operating a redox flow battery.

BACKGROUND

The demand for electric power fluctuates greatly during the course of a day. Power generation, too, fluctuates with increasing proportion of power from renewable energy sources during the course of a day. To be able to equalize an oversupply of power at times with a great deal of sun and strong wind while there is a low demand for power, it is necessary to have regulatable power stations or stores for storing this energy. Batteries are stores for electric energy which have an electrochemical basis and are suitable for storing the excess energy. If the battery is a rechargeable store, this is also referred to as accumulator. A single rechargeable storage element is also referred to as secondary element.

In redox flow batteries, the electrode-active material is liquid, in contrast to classical secondary elements. This liquid electrolyte is stored in a tank and pumped through a cathode space having a cathode and/or through an anode space having an anode. The electrode-active material is reduced or oxidized at the electrodes. The liquid electrolyte therefore advantageously comprises a reduction-oxidation pair as electrode-active material. The electrolyte comprises, in particular, oxides of transition metals as reduction-oxidation pair. The reduction-oxidation pair can, disadvantageously, be present in the wrong, i.e. the opposite, reduction or oxidation status at the beginning of the chemical reaction. Furthermore, the utilizable capacity can decrease during operation as a result of an unwanted shift in the oxidation states during operation of the redox flow battery because of undesirable secondary reactions.

SUMMARY

The teachings of the present disclosure describe methods for operating a redox flow battery and also a redox flow battery which make it possible to set the reduction or oxidation status of the reduction-oxidation pair at the beginning of or during operation of the redox flow battery. For example, some embodiments include a method for operating an electrically rechargeable redox flow battery (1) including: provision of a redox flow battery (1) comprising a first chamber and a second chamber (4, 5) separated by a membrane (3), with the first chamber (4) comprising a cathode (15) and the second chamber (5) comprising an anode (16), introduction of a first electrolyte (10) as catholyte into the first chamber (4) and introduction of a second electrolyte (11) as anolyte into the second chamber (5), with the first and/or second electrolyte (10, 11) comprising a reduction-oxidation pair, characterized in that the oxidation number of the reduction-oxidation pair is changed by addition of a first component to the first and/or second electrolyte (10, 11) and/or in that the oxidation number is changed electrochemically, with the first electrolyte (10) comprising a first reduction-oxidation pair and the second electrolyte comprising a second reduction-oxidation pair, with a polyoxometalate being used as first and/or second reduction-oxidation pair and with the oxidation number of the first and/or second reduction-oxidation pair being decreased, with hydrazine, an alkali metal, a hydride, an aldehyde, sodium sulfite, sodium dithionite or sodium thiosulfate being used as first component.

In some embodiments, the addition of the first component is carried out in the discharged state of the redox flow battery (1).

In some embodiments, the residual capacity of the redox flow battery (1) is measured and a first amount of the first component is introduced in relation to the measured residual capacity.

In some embodiments, the electrochemical changing of the oxidation number of the reduction-oxidation pair is effected by means of a first activating electrode (17) in the first chamber (4) and/or by means of a second activating electrode (18) in the second chamber (5).

In some embodiments, the electrochemical changing of the oxidation number of the reduction-oxidation pair is effected by means of catalysts on the first and/or second activating electrode (17, 18).

In some embodiments, the electrochemical changing of the oxidation number of the reduction-oxidation pair is effected by means of additives on the first and/or second activating electrode (17, 18).

In some embodiments, a voltage is applied to the first and/or second activating electrode (17, 18) as a function of the residual capacity of the redox flow battery.

As another example, some embodiments include an electrically rechargeable redox flow battery (1) for carrying out the method as claimed in any of claims 1 to 7, comprising: a first and second chamber (4, 5) separated by a membrane (3), with the first chamber (4) comprising a cathode (15) and the second chamber (5) comprising an anode (16) and the first chamber (4) being suitable for accommodating a first electrolyte (10) as catholyte and the second chamber (5) being suitable for accommodating a second electrolyte (11) as anolyte, with the first and/or the second electrolyte comprising a reduction-oxidation pair, a first pump (8) for pumping the catholyte through the first chamber (4), a second pump (9) for pumping the anolyte through the second chamber (5), and a feed device (13, 14) suitable for feeding a first component into the first and/or second chamber (4, 5).

In some embodiments, the first chamber (4) comprises a first activating electrode (17) and the second chamber (5) comprises a second activating electrode (18) and the first and second activating electrodes (17, 18) are suitable for bringing about an electrochemical change in the reduction-oxidation pair.

BRIEF DESCRIPTION OF THE DRAWINGS

Further features, properties, and advantages of the teachings of the present disclosure may be derived from the following description with reference to the accompanying FIGURE.

The single FIGURE shows a rechargeable redox flow battery incorporating teachings of the present disclosure.

DETAILED DESCRIPTION

In some embodiments, a redox flow battery comprising a first chamber and a second chamber separated by a membrane, with the first chamber comprising a cathode and the second chamber comprising an anode, is provided. A first electrolyte is fed as catholyte into the first chamber and a second electrolyte is fed as anolyte into the second chamber, with the first electrolyte and/or second electrolyte comprising a reduction-oxidation pair. The oxidation number of the reduction-oxidation pair is changed by addition of a first component to the first and/or second electrolyte and/or the oxidation number of the reduction-oxidation pair is changed electrochemically.

In some embodiments, an electrically rechargeable redox flow battery comprises a first chamber and a second chamber separated by a membrane, with the first chamber comprising a cathode and the second chamber comprising an anode and with the first chamber being suitable for accommodating an electrolyte as catholyte and the second chamber being suitable for accommodating the electrolyte as anolyte, with the electrolyte comprising a reduction-oxidation pair. The redox flow battery further comprises a first pump for pumping the catholyte through the first chamber and a second pump for pumping the anolyte through the second chamber. Furthermore, the redox flow battery comprises a feed device suitable for feeding a first component into the first and/or second chamber. This feed device may be arranged at an inlet for the electrolytes.

In some embodiments, it is possible to change the oxidation number at the commencement of operation of the rechargeable redox flow battery or during operation of the rechargeable redox flow battery. In particular, it is made possible to activate a reduction-oxidation pair in the electrolyte before operation, to reactivate it or deactivate it during operation. In some embodiments, activation and reactivation are possible for the polyoxometalate PV14O40. This polyoxometalate can be reduced and thus activated or, if the redox flow battery is already in operation, reactivated by means of hydrazine as reducing agent. The addition of hydrazine can thus be carried out before or during operation of the redox flow battery.

In some embodiments, the first electrolyte comprises a first reduction-oxidation pair and the second electrolyte comprises a second reduction-oxidation pair. In some embodiments, a polyoxometalate is used as the first and/or second reduction-oxidation pair. The chemical structure of the polyoxometalates can advantageously be matched to particular use objectives of a redox flow battery. In particular, polyoxometalates having fast reaction kinetics and a plurality of possible electron transitions are advantageous for use in redox flow batteries.

In some embodiments, the oxidation number of the first and/or second reduction-oxidation pair is decreased. In particular, the oxidation number of the polyoxometalate is decreased. The method makes it possible to convert the polyoxometalate into an active state by addition of a reducing agent or by means of electrochemical reduction, so that the polyoxometalate is present as reduction-oxidation pair in the first and/or second chamber of the redox flow battery. In particular, tetradecavanadophosphate $[PV(V)_{14}O_{42}]^{9-}$, where the vanadium has the oxidation number five (V), which is made clear in the parentheses of the formula, can be reduced from this oxidized state to $H_6[PV(V)_8 V(IV)_6O_{42}]^{9-}$, where six of the total of fourteen vanadium atoms occurring in this compound have the oxidation number four (IV).

In some embodiments, hydrazine, an alkali metal, a hydride, an aldehyde, sodium sulfite, sodium dithionite or sodium thiosulfate is used as first component for decreasing the oxidation number of the first and/or second reduction-oxidation pair. Hydrazine in particular is a strong reducing agent and thus effective in the activation of the reduction-oxidation pairs.

In some embodiments, the oxidation number of the first and/or second reduction-oxidation pair is increased. In particular, hydrogen peroxide, permanganate, oxygen, halogens or noble metal ions are used as oxidizing agent. Particularly when neutral reduction-oxidation pairs are present at the commencement of operation of the redox flow battery, some embodiments may include oxidizing half of the reduction-oxidation pairs. These are then fed into the cathode space, i.e. the first chamber, in order to be reduced again there. The second half is reduced. This half is fed into the second chamber, i.e. the anode space, and oxidized there. The reduction or oxidation can be carried out in the stock tanks before commencement of operation. Addition directly into the first or second chamber is likewise useful during ongoing operation.

In some embodiments, the addition of the first component is carried out to reactivate the battery in the discharged state of the redox flow battery. The addition of the first component can be carried out in any state of the battery, from fully charged to flat. However, the addition of the first component may be done in the flat state, since the amount of the first component to be added can then be determined precisely and the addition thereof is thus particularly effective.

In some embodiments, in order to reactivate the battery, a residual capacity of the redox flow battery is measured and a first amount of the first component is added in relation to the measured residual capacity. For the present purposes, the residual capacity is the remaining utilizable capacity at a particular point in time. It is possible to activate 50-100% of the theoretically utilizable storage capacity of the redox flow battery in this way. The first amount of the first component which is added is determined in a proportion of the theoretically utilizable storage capacity of the redox flow battery. In particular, this proportion can be indicated as a percentage.

In some embodiments, the change in the oxidation number of the reduction-oxidation pair is brought about electrochemically by means of a first activating electrode in the first chamber and/or by means of a second activating electrode in the second chamber. These activating electrodes may form an electrode pair. It is likewise conceivable for the anode and cathode of the first and second chambers to be used as activating electrodes. In this case, the stability of the electrodes at the voltage to be applied for the electrochemical reduction or oxidation need to be taken into account. If the anode and the cathode are stable at the applied voltage, some embodiments use these since the use of a second electrode pair is then avoided.

In some embodiments, the electrochemical changing of the oxidation number of the reduction-oxidation pair is effected by means of catalysts on the first and/or second activating electrode.

In some embodiments, the electrochemical changing of the oxidation number of the reduction-oxidation pair is effected by means of additives on the first and/or second activating electrode. The additives are, in particular, present on the electrodes and in the total electrolyte. They can, in particular, also be released from the electrode and subsequently be consumed.

In some embodiments, a voltage is applied to the first and/or second activating electrode as a function of the residual capacity of the redox flow battery. This makes it possible to control the reaction of the redox flow battery. Furthermore, overvoltages or undervoltages can be avoided.

In some embodiments, the first chamber comprises a first activating electrode and the second chamber comprises a second activating electrode. The first and second activating electrodes are suitable for bringing about an electrochemical change in the reduction-oxidation pair.

The FIGURE shows a rechargeable redox flow battery 1. The rechargeable redox flow battery comprises a redox flow unit 2. The redox flow unit 2 comprises a membrane 3 which separates a first chamber 4 and a second chamber 5 from one another. A cathode 15 is arranged in the first chamber 4. An anode 16 is arranged in the second chamber 5. The cathode 15 and the anode 16 are connected via an electric energy connection 12 to a power grid. The first chamber 4 further comprises a first activating electrode 17. The second chamber 5 comprises a second activating electrode 18.

The first chamber 4 and the second chamber 5 are suitable for accommodating an electrolyte. In this example, a first electrolyte 10 is present in the first chamber 4. A second electrolyte 11 is present in the second chamber 5. The first electrolyte is pumped into the redox flow unit 2 by means of the first pump 8 and the second electrolyte 11 is pumped into the redox flow unit 2 by means of the second pump 9. The electrolyte 10, 11 is subsequently conveyed from the redox flow unit 2 back into the tanks. The electrolyte is initially charged in a first tank 6 and a second tank 7. In this example, the first electrolyte 10 and the second electrolyte 11 comprise a polyoxometalate. The polyoxometalate is present in an inactive form at the commencement of operation.

In this example, tetradecavanadophosphate $[PV(V)_{14}O_{42}]^{9-}$ (abbreviation: PV14) in oxidized form is used as polyoxometalate in the first chamber, e.g. the cathode space. The polyoxometalate is converted into an active form, which in this example is the reduced form $H_6[PV(V)_8V(IV)_6O_{42}]^{9-}$, by addition of a first component through conduit 13 and conduit 14. In some embodiments, the first component may be added during operation in order to reactivate the polyoxometalate.

In some embodiments, the first component, in particular hydrazine, is introduced into the redox flow unit 2 as a function of a residual capacity of the latter. In particular, the residual capacity is in the range from 60% to 90% when the first component hydrazine is introduced. As an alternative to or in addition to addition of a first component, in particular hydrazine, the activation of, in particular, the polyoxometalate can also be carried out electrochemically. Here, it is possible for the first activating electrode 17 and the second activating electrode 18 to convert the polyoxometalate from the inactive form into the active form. This conversion can be accelerated by means of additives and catalysts. It is thus possible to use polyoxometalate as reduction-oxidation pair in redox flow batteries and to activate and reactivate it as a function of the mode of operation.

What is claimed is:

1. A method for operating an electrically rechargeable redox flow battery comprising a first chamber and a second chamber separated by a membrane, with the first chamber housing a cathode and the second chamber housing an anode, the method comprising:
    introducing a first electrolyte as catholyte into the first chamber;
    introducing a second electrolyte as anolyte into the second chamber;
    wherein at least one of the first electrolyte and the second electrolyte comprises a reduction-oxidation pair;
    measuring a residual capacity of the redox flow battery; and
    introducing a first amount of a first component to either the first chamber or the second chamber to change an oxidation number of the reduction-oxidation pair;
    wherein the first amount depends on the measured residual capacity.

2. The method as claimed in claim 1, wherein the addition of the first component is carried out in a discharged state of the redox flow battery.

3. The method as claimed in claim 1, wherein introducing a first amount of a first component includes using a first activating electrode in the first chamber and/or by a second activating electrode in the second chamber to convert polyoxometalate from an inactive form to an active form.

4. The method as claimed in claim 3, wherein introducing a first amount of a first component includes using catalysts present on the first activating electrode and/or the second activating electrode.

5. The method as claimed in claim 3, further comprising applying a voltage to the first and/or second activating electrode as a function of the residual capacity of the redox flow battery.

6. A method for operating an electrically rechargeable redox flow battery comprising a first chamber and a second chamber separated by a membrane, with the first chamber housing a cathode and the second chamber housing an anode, the method comprising:
    introducing a catholyte into the first chamber;
    introducing an anolyte into the second chamber;
    adding a first component to a first reduction-oxidation pair including a polyoxometalate in at least one of the first chamber and the second chamber;
    wherein the first component comprises at least one substance selected from the group consisting of: hydrazine, an alkali metal, a hydride, an aldehyde, sodium sulfite, sodium dithionite, and sodium thiosulfate.

* * * * *